United States Patent
Winzenread

(10) Patent No.: US 10,785,425 B2
(45) Date of Patent: Sep. 22, 2020

(54) IMAGE SENSOR WITH SELECTIVE PIXEL BINNING

(71) Applicant: SEMICONDUCTOR COMPONENTS INDUSTRIES, LLC, Phoenix, AZ (US)

(72) Inventor: Rusty Winzenread, San Jose, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 22 days.

(21) Appl. No.: 16/225,704

(22) Filed: Dec. 19, 2018

(65) Prior Publication Data
US 2020/0106971 A1 Apr. 2, 2020

Related U.S. Application Data

(60) Provisional application No. 62/738,072, filed on Sep. 28, 2018.

(51) Int. Cl.
*H04N 5/347* (2011.01)
*H04N 5/378* (2011.01)
*H04N 5/3745* (2011.01)

(52) U.S. Cl.
CPC ............. *H04N 5/347* (2013.01); *H04N 5/378* (2013.01); *H04N 5/3745* (2013.01)

(58) Field of Classification Search
CPC ....... H04N 5/347; H04N 5/378; H04N 5/3745
See application file for complete search history.

(56) References Cited

U.S. PATENT DOCUMENTS

| 7,705,900 B2 | 4/2010 | Guidash |
| 2005/0030402 A1* | 2/2005 | Agranov .............. H04N 5/3597 348/308 |
| 2005/0133687 A1 | 6/2005 | Bock |
| 2006/0077269 A1 | 4/2006 | Kindt et al. |
| 2006/0274176 A1* | 12/2006 | Guidash ............ H01L 27/14643 348/300 |
| 2010/0118167 A1 | 5/2010 | Johnson |
| 2013/0327950 A1* | 12/2013 | Niwa ........................ G01T 1/17 250/395 |
| 2013/0341490 A1 | 12/2013 | Mansoorian et al. |

(Continued)

*Primary Examiner* — Ahmed A Berhan
(74) *Attorney, Agent, or Firm* — Treyz Law Group, P.C.; Joseph F. Guihan

(57) ABSTRACT

An image sensor may include an array of imaging pixels. Each imaging pixel may have a photodiode that generates charge in response to incident light, a floating diffusion region, and a transfer transistor that transfers charge from the photodiode to the floating diffusion region. Each floating diffusion region may have an associated capacitance formed by a depletion region between n-type and p-type regions in a semiconductor substrate. To enable selective binning in the voltage domain, a number of transistors may be coupled to the floating diffusion capacitors. A first plurality of pixels may selectively couple the floating diffusion capacitors to ground. A second plurality of pixels may selective couple the floating diffusion capacitors to the floating diffusion capacitors of adjacent pixels. The voltages of multiple floating diffusion capacitors may be non-destructively binned on a single floating diffusion capacitor during readout.

18 Claims, 15 Drawing Sheets

(56) References Cited

U.S. PATENT DOCUMENTS

| | | | | |
|---|---|---|---|---|
| 2014/0239447 A1* | 8/2014 | Snowdon | ………… | H01L 23/49816 |
| | | | | 257/533 |
| 2015/0130977 A1* | 5/2015 | Ladd | …………… | H04N 5/347 |
| | | | | 348/308 |
| 2015/0350575 A1 | 12/2015 | Agranov et al. | | |

* cited by examiner

IMAGE SENSOR WITH SELECTIVE PIXEL BINNING

This application claims benefit of and claims priority to provisional patent application No. 62/738,072, filed Sep. 28, 2018, which is hereby incorporated by reference herein in its entirety.

BACKGROUND

This relates generally to image sensors and, more particularly, to image sensors with pixel binning capabilities.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Each pixel receives incident photons (light) and converts the photons into electrical signals. Column circuitry is coupled to each pixel column for reading out pixel signals from the image pixels. Image sensors are sometimes designed to provide images to electronic devices using a Joint Photographic Experts Group (JPEG) format.

Several image sensor applications require pixel binning. In some conventional image sensors, pixel binning is achieved by combining electrons from multiple pixels on a single node before readout. In other conventional image sensors, digital signals from pixels may be combined after readout. However, such conventional image sensors may suffer from limited flexibility and/or lower than desired frame rates.

It would therefore be desirable to provide an improved imaging sensor with variable pixel binning.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
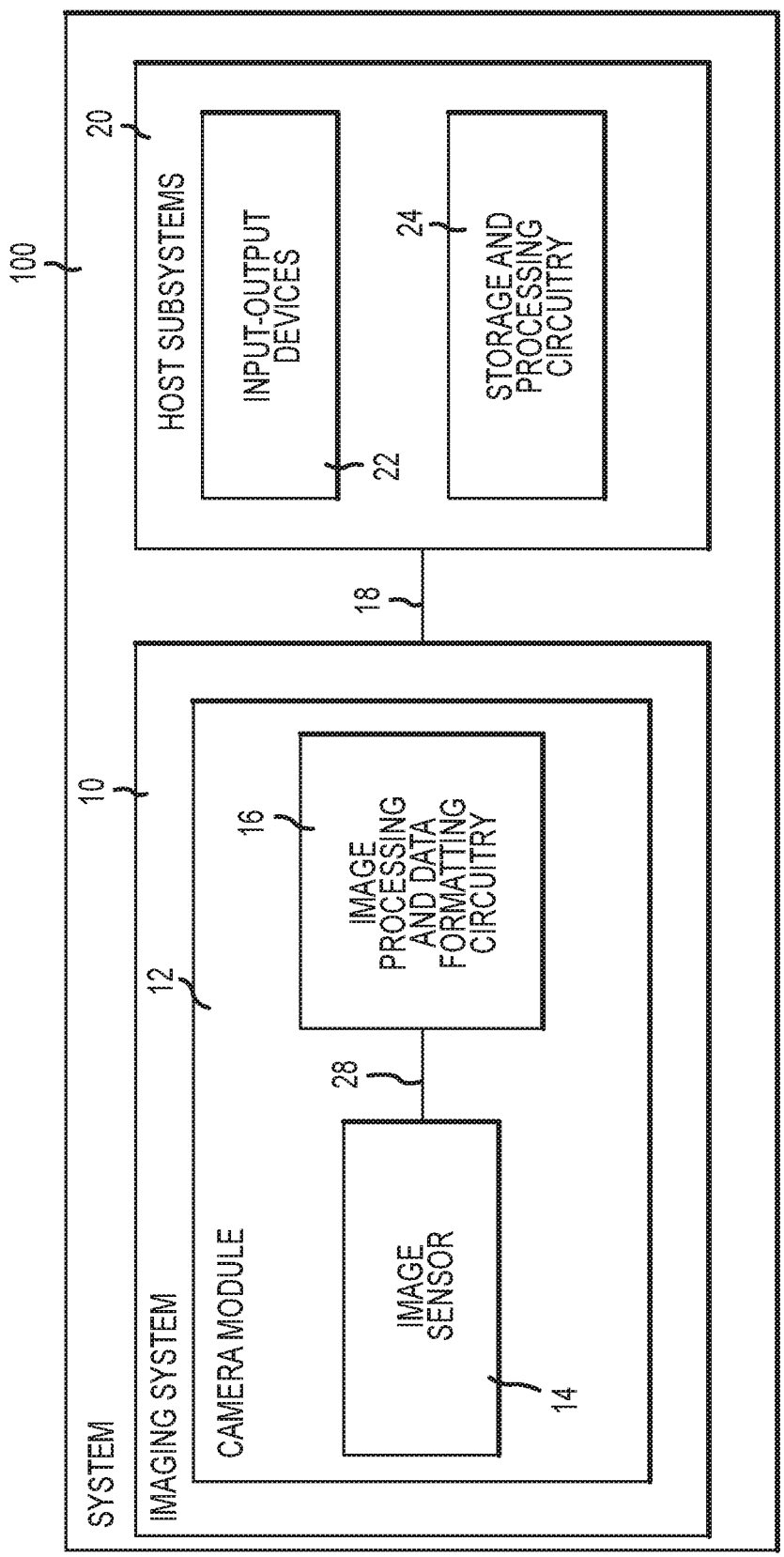
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14 (such as the image sensor of FIG. 2). Image sensor 14 may include photosensitive elements (i.e., pixels)

that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

Figure 2:
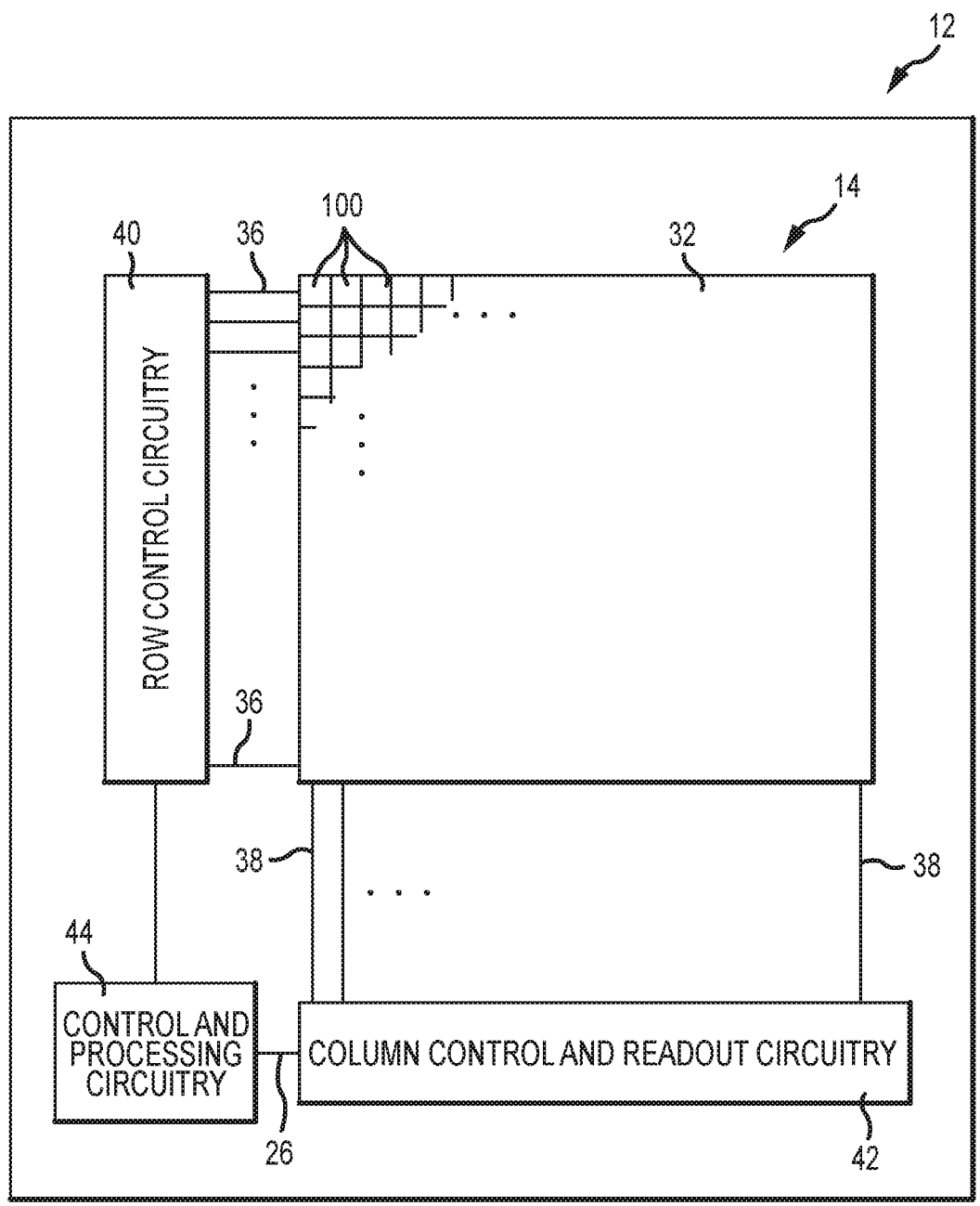
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 100 (sometimes referred to herein as image sensor pixels, imaging pixels, or image pixels 100) and may also include control circuitry 40 and 42. Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 100 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 100 in image pixel array 32 (e.g., each column of pixels may be coupled to a corresponding column line 38). Column lines 38 may be used for reading out image signals from image pixels 100 and for supplying bias signals (e.g., bias currents or bias voltages) to image pixels 100. During image pixel readout operations, a pixel row in image pixel array 32 may be selected using row control circuitry 40 and image data associated with image pixels 100 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Pixel array 32 may be provided with a color filter array having multiple color filter elements, which allows a single image sensor to sample light of different colors. As an example, image sensor pixels such as the image pixels in array 32 may be provided with a color filter array that allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). In yet another example, the image sensor may be a monochrome sensor where each pixel is covered by a color filter element of the same type (e.g., a clear color filter element). These examples are merely illustrative and, in general, color filter elements of any desired color and in any desired pattern may be formed over any desired number of image pixels 100.

If desired, array 32 may be part of a stacked-die arrangement in which pixels 100 of array 32 are split between two or more stacked substrates. In such an arrangement, each of the pixels 100 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

The image sensor may be implemented in a vehicle safety system. In a vehicle safety system, images captured by the image sensor may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, an image sensor may form part of a semi-autonomous or autonomous self-driving vehicle.

Figure 3:
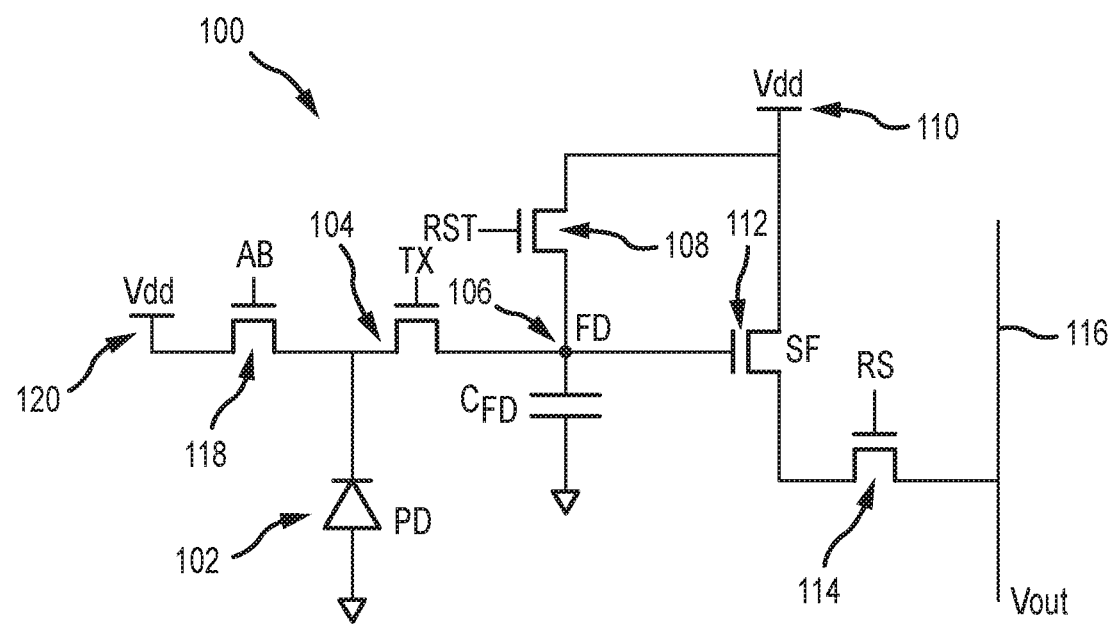
FIG. 3 is a circuit diagram of an illustrative imaging pixel in accordance with an embodiment.

To improve performance of the image sensor, an image sensor may have pixel binning capabilities. FIG. 3 shows an illustrative imaging pixel that may be included in an image sensor with selective pixel binning. As shown in FIG. 3, pixel 100 may include a photodiode 102 (PD). A transfer transistor 104 (TX) may be coupled to the photodiode. When transfer transistor 104 is asserted, charge may be transferred from photodiode 102 to an associated floating diffusion region 106 (FD). The floating diffusion region may have an associated capacitance $C_{FD}$ as shown. The associated capacitance $C_{FD}$ may be formed by a depletion region between an n-type region and p-type region in a semiconductor substrate. The associated capacitance $C_{FD}$ may sometimes be referred to as a floating diffusion capacitor (or floating diffusion region capacitor) $C_{FD}$. The n-type region may form the upper plate of the floating diffusion capacitor and the p-type region may form the lower plate of the floating diffusion capacitor. A reset transistor 108 (RST) may be coupled between floating diffusion region 106 and a bias voltage supply terminal 110. When reset transistor 108 is asserted, the voltage of floating diffusion region 106 may be reset.

Floating diffusion region 106 may be coupled to the gate of source follower transistor 112 (SF). The source follower transistor is coupled between bias voltage supply terminal 110 and row select transistor 114 (RS). When row select transistor 114 is asserted, an output voltage $V_{OUT}$ may be provided to a column output line 116.

Pixel 100 may also include an anti-blooming transistor 118 (AB) that is coupled between photodiode 102 and bias voltage supply terminal 120. When anti-blooming transistor 118 is asserted, charge from photodiode 102 may be cleared to bias voltage supply terminal 120.

The example of FIG. 3 is merely illustrative. The imaging pixel may have any desired transistor architecture. For example, the imaging pixel may include charge storage regions (e.g., storage capacitors, storage gates, storage diodes, etc.), the imaging pixel may include dual conversion gain capacitors and/or dual conversion gain transistors, etc.

To allow for selective pixel binning, transistors may be included in the image sensor that allow pixel binning in the voltage domain. The floating diffusion regions of adjacent pixels may be coupled together for non-destructive binning. For example, additional transistors may be incorporated that allow selective summation of the voltage on the floating diffusions of different pixels.

Figure 4:
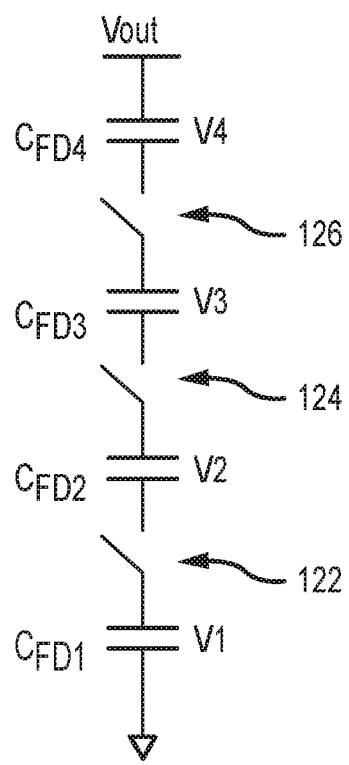
FIG. 4 is a schematic diagram illustrating the concept of pixel binning in the voltage domain in accordance with an embodiment.

FIG. 4 is a schematic diagram illustrating the concept of pixel binning in the voltage domain. As an example, four imaging pixels may have respective floating diffusion capacitors $C_{FD1}$, $C_{FD2}$, $C_{FD3}$, and $C_{FD4}$. Switches (e.g., transistors) such as switches 122, 124, and 126 may be coupled between the floating diffusion regions. Each floating diffusion region may have its own respective voltage. However, closing the switches will cause the voltage of one floating diffusion region to influence the voltage of an adjacent floating diffusion region.

For example, consider an example where $C_{FD1}$ has an associated voltage V1 (e.g., 1 V), $C_{FD2}$ has an associated voltage V2 (e.g., 2 V), $C_{FD3}$ has an associated voltage V3 (e.g., 3 V), and $C_{FD4}$ has an associated voltage V4 (e.g., 4 V). When switches 122, 124, and 126 are all open, each floating diffusion has its respective voltage. If switch 122 is closed, however, the voltage on $C_{FD2}$ will become equal to V2+V1 (instead of just V2). If switches 122 and 124 are both closed, the voltage on $C_{FD3}$ will become equal to V3+V2+V1. If switches 122, 124, and 126 are all closed, then $V_{OUT}$=V4+V3+V2+V1. If the switches are all then reopened, the voltages at each floating diffusion will return to their original levels.

To summarize, selective coupling of floating diffusion regions between pixels allows for selective binning of pixel signals in the voltage domain. Selective binning may increase frame rate for the image sensor (because fewer total pixels need to be read out).

Figure 5:
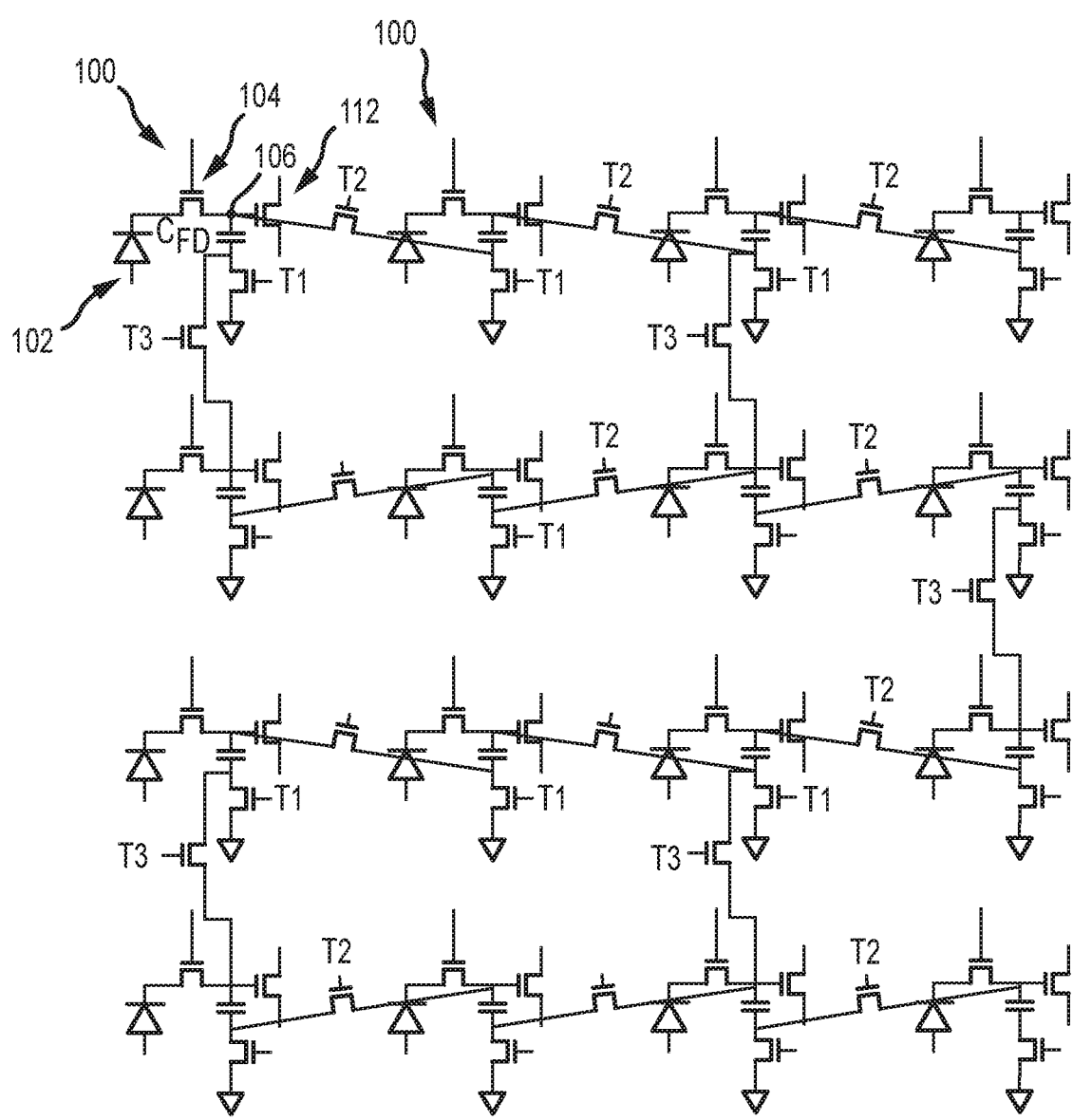
FIG. 5 is a circuit diagram of an illustrative image sensor having transistors that enable selective pixel binning in the voltage domain in accordance with an embodiment.

FIG. 5 is circuit diagram showing a portion of an illustrative image sensor with transistors that enable selective binning in the voltage domain. For simplicity, in FIG. 5 only the photodiodes 102, transfer transistors 104, floating diffusion regions 106, and source follower transistors 112 of each pixel 100 are shown. However, it should be understood that each pixel in FIG. 5 may include any of the components shown in FIG. 3 or any other desired pixel components (e.g., storage capacitors, storage gates, storage diodes, dual conversion gain capacitors, dual conversion gain transistors, etc.).

Additionally, the image sensor may include transistors such as transistors T1, T2, and T3. Each transistor T1 may be coupled between a respective $C_{FD}$ (e.g., the p-type layer of a floating diffusion region capacitance) and ground. Each transistor T2 may be coupled to the floating diffusion region of a first pixel (e.g., the n-type layer of a floating diffusion capacitor). Each transistor T2 may also be coupled to a respective node between the capacitor $C_{FD}$ and ground on an adjacent, second pixel (e.g., the p-type layer of a floating diffusion capacitor). Specifically, each transistor T2 is coupled between $C_{FD}$ and transistor T1 of the adjacent, second pixel. Transistors T2 may couple adjacent pixels that are in the same row in the image sensor.

Each transistor T3 may be coupled to the floating diffusion region of a first pixel (e.g., the n-type layer of a floating diffusion capacitor). Each transistor T3 may also be coupled to a respective node between the capacitor $C_{FD}$ and ground on an adjacent, second pixel (e.g., the p-type layer of a floating diffusion capacitor). Specifically, each transistor T3 is coupled between $C_{FD}$ and transistor T1 of the adjacent, second pixel. Transistors T3 may couple adjacent pixels that are in the same column in the image sensor. Transistors T2 and T3 may be coupled to the same node between $C_{FD}$ and transistor T1 of a given pixel.

In FIG. 5, each pixel is depicted as having a respective transistor T1. A transistor T2 is depicted as being connected between each adjacent pair of pixels in the image sensor. However, a transistor T3 is depicted as being connected only between some adjacent pairs of pixels in the image sensors. This example is merely illustrative. In general, every pixel may or may not be coupled to a respective transistor T1, T2, and/or T3. The more transistors T1, T2, and T3 that are included in the image sensor, the greater the flexibility of the provided pixel binning. The arrangement of FIG. 5 may provide for 1×1 binning (e.g., no binning), 2×2 binning, and 4×4 binning capabilities. If the pattern of FIG. 5 is repeated across the image sensor, additional binning patterns (16×16, 32×32, 64×64, etc.) will also be possible.

Figure 6:
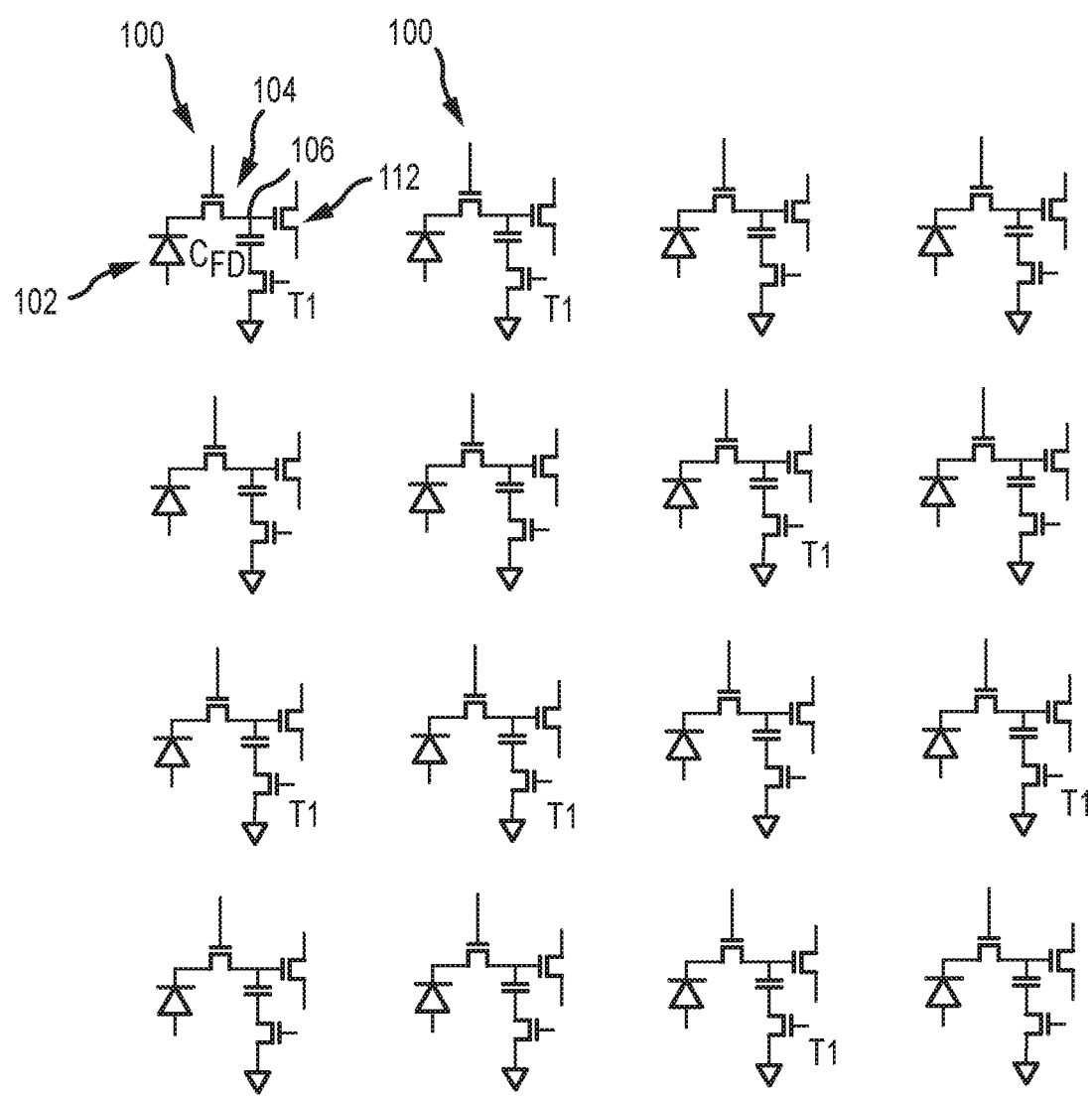
FIG. 6 is a circuit diagram of the image sensor of FIG. 5 in an illustrative 1×1 binning mode in which each pixel is read out individually in accordance with an embodiment.
Figure 7:
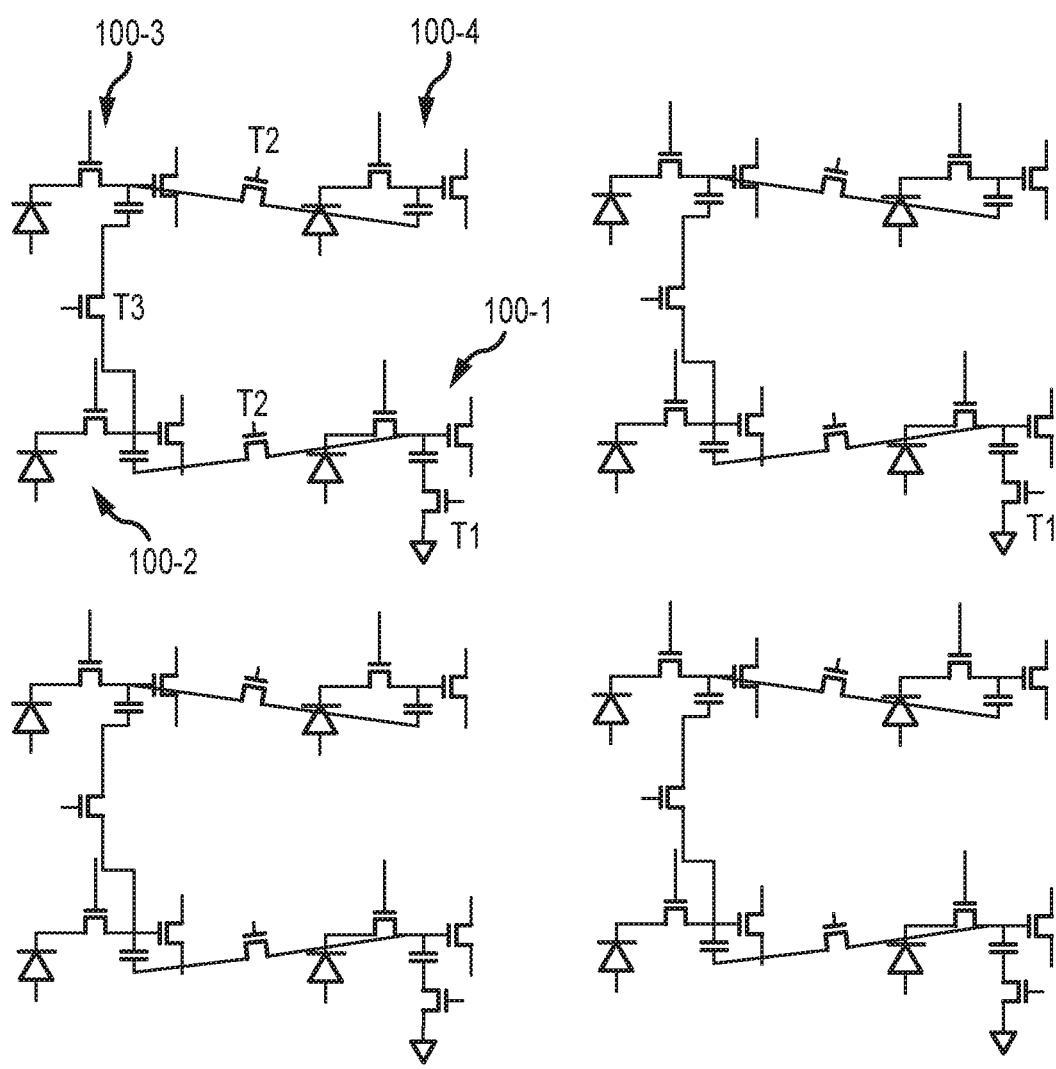
FIG. 7 is a circuit diagram of the image sensor of FIG. 5 in an illustrative 2×2 binning mode in which pixel signals from each 2×2 group of imaging pixels are binned in the voltage domain before readout in accordance with an embodiment.
Figure 8:
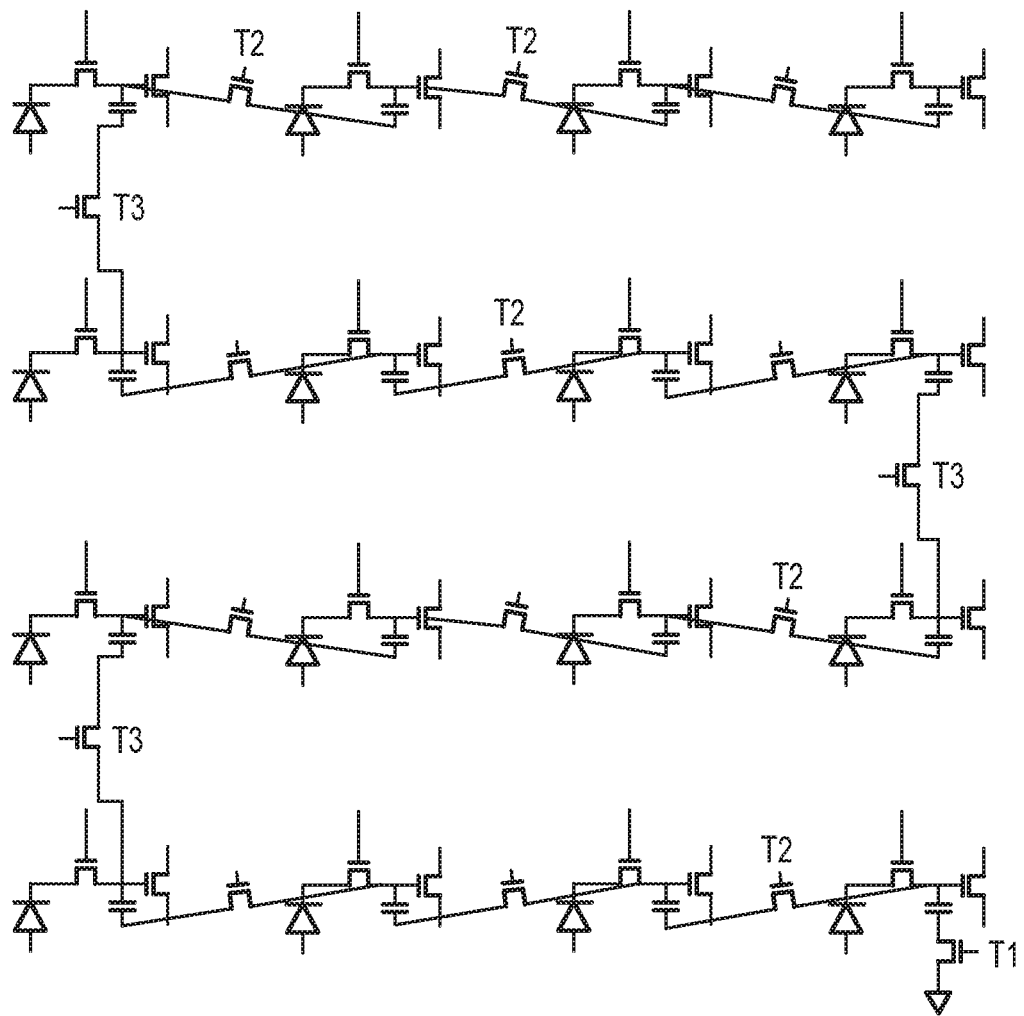
FIG. 8 is a circuit diagram of the image sensor of FIG. 5 in an illustrative 4×4 binning mode in which pixel signals from each 4×4 group of imaging pixels are binned in the voltage domain before readout in accordance with an embodiment.

FIGS. 6-8 illustrate different binning modes of the image sensor shown in FIG. 5. For simplicity, in FIGS. 6-8 only the photodiodes 102, transfer transistors 104, floating diffusion regions 106, and source follower transistors 112 of each pixel 100 are shown. However, it should be understood that each pixel in FIGS. 6-8 may include any of the components shown in FIG. 3 or any other desired pixel components (e.g., storage capacitors, storage gates, storage diodes, dual conversion gain capacitors, dual conversion gain transistors, etc.).

Additionally, for simplicity, in FIGS. 6-8 only the transistors T1, T2, T3 that are asserted in the given binning mode are depicted in the figures. However, it should be understood that all of the transistors in FIG. 5 are present in the image sensor of FIGS. 6-8; the deasserted transistors are just not depicted in FIGS. 6-8.

FIG. 6 shows an illustrative 1×1 binning mode (e.g., no binning mode) in which each pixel is read out individually. As shown, the transistor T1 for each pixel is asserted, coupling the floating diffusion regions of each pixel to ground. This mode provides the highest resolution image data.

FIG. 7 shows an illustrative 2×2 binning mode in which pixel signals from each 2×2 group of imaging pixels are binned in the voltage domain before readout. As shown in FIG. 7, a given 2×2 group of imaging pixels including pixels 100-1, 100-2, 100-3, and 100-4 may be binned. Transistor T1 of pixel 100-1 is asserted, coupling the floating diffusion region of 100-1 to ground. However, T2 between transistors 100-1 and 100-2 is asserted to couple the floating diffusion region of pixel 100-1 to the floating diffusion region of pixel 100-2. T3 between transistors 100-2 and 100-3 is asserted to couple the floating diffusion region of pixel 100-2 to the floating diffusion region of pixel 100-3. T2 between transistors 100-3 and 100-4 is asserted to couple the floating diffusion region of pixel 100-3 to the floating diffusion region of pixel 100-4. In this way, the voltage at the floating diffusion region of pixel 100-4 will be equivalent to the floating diffusion voltages of pixels 100-1, 100-2, 100-3, and 100-4 (similar to how $V_{OUT}=V1+V2+V3+V4$ in connection with FIG. 4). This effectively bins the pixel signal levels. Only the upper-right pixel 100-4 of each 2×2 group may be read out. This results in a frame rate that is four times faster than when every pixel level is read out. The faster frame rate may be better for imaging moving objects (e.g., for better velocity determination).

FIG. 8 shows an illustrative 4×4 binning mode in which pixel signals from each 4×4 group of imaging pixels are binned in the voltage domain before readout. As shown in FIG. 8, transistor T1 of the lower-right pixel is asserted, coupling the floating diffusion region the lower-right pixel to ground. A chain of transistors T2 and T3 are also asserted between the floating diffusion regions of adjacent pixels until the upper-right pixel is reached. This effectively bins the pixel signal levels of all sixteen pixels depicted in FIG. 8. Only the upper-right pixel of each 4×4 group may be read out. This results in a frame rate that is sixteen times faster than when every pixel level is read out.

When operating the image sensor of FIGS. 5-8, correlated double sampling may be used. Before the transfer transistors are asserted to transfer charge from the photodiodes to the floating diffusion regions, the floating diffusion region may be reset and a reset level of the floating diffusion region may be sampled. If desired, the floating diffusion region may be reset and sampled while all of transistors T1, T2, and T3 are deasserted. After sampling the reset level, charge from the photodiodes may be transferred to respective floating diffusion regions. Transistors T1, T2, and T3 may be deasserted during charge transfer. Alternatively, transistors T1, T2, and T3 may optionally remain asserted during charge transfer. After charge transfer, the selected transistors T1, T2, and T3 associated with the given binning mode may be asserted (e.g., for a 1×1 binning mode the transistors of FIG. 6 may be asserted, for a 2×2 binning mode the transistors of FIG. 7 may be asserted, for a 4×4 binning mode the transistors of FIG. 8 may be asserted). The signal levels of the floating diffusion regions of desired pixels (e.g., one for each binned group) may then be read out.

An illustrative method of operating the image sensor shown in FIGS. 5-8 will now be discussed. First, charge may be integrated on the photodiode. In one illustrative example, the integration time may be started by asserting an anti-blooming transistor (e.g., anti-blooming transistor 118 in FIG. 3). In another example, the integration time may be started by asserting the transfer transistor and reset transistor simultaneously (e.g., transistors 104 and 108 in FIG. 3).

Next, before reading out the photodiode, the floating diffusion region may be reset to remove any accumulated charge from the floating diffusion region. To reset the floating diffusion region, all of the transistors T1 in the image sensor may be asserted to ground all of the floating diffusion region capacitors ($C_{FD}$). Next, the reset transistor (108) for each transistor may be asserted to reset the voltage of the floating diffusion region capacitors. After resetting the voltage of the floating diffusion region capacitors, the desired combination of transistors T1, T2, and T3 for a particular binning arrangement may be asserted (e.g., as in FIG. 6 for 1×1 binning, as in FIG. 7 for 2×2 binning, as in FIG. 8 for 4×4 binning). Once the desired transistors T1, T2, and T3 are asserted, the reset voltage of the pixels of interest (e.g., the pixels that will be read out for that particular binning mode) may be sampled.

After sampling the reset voltage, all of the transistors T1 may be asserted (e.g., even if they will not later be asserted for that particular binning arrangement). The transfer transistors may then be asserted, transferring charge to the floating diffusion regions. After charge transfer, the transfer transistors are deasserted. Then, the desired combination of transistors T1, T2, and T3 for the particular binning arrangement (e.g., the same combination of transistors T1, T2, and T3 as during the reset signal sampling) may be asserted. Once the desired transistors T1, T2, and T3 are asserted, the signal voltage of the pixels of interest (e.g., the pixels that are read out for that particular binning mode) may be sampled.

Figure 9:
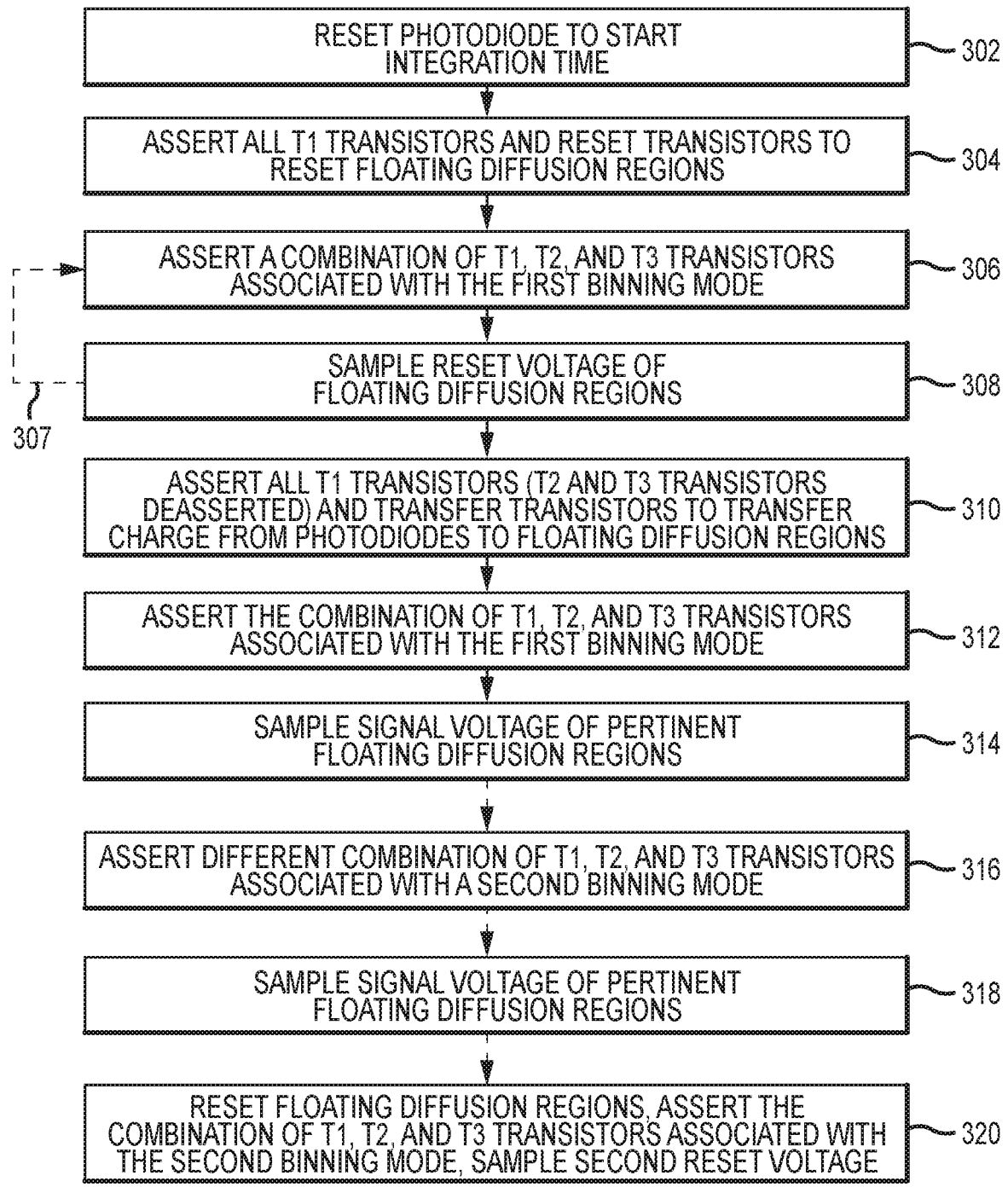
FIG. 9 is a flowchart of illustrative method steps for operating the image sensor of FIG. 5 in accordance with an embodiment.

FIG. 9 is a flowchart of illustrative method steps for operating the image sensor of FIGS. 5-8. At step 302, the photodiodes may be reset to begin the integration time. The photodiodes may be reset by asserting the anti-blooming transistors of each pixel, for example. After the integration time, to begin the readout, all T1 transistors may be asserted at step 304. Asserting the T1 transistors grounds each floating diffusion region, and the floating diffusion regions may then be reset by asserting the reset transistors of the pixels.

After the floating diffusion regions are reset at step 304, a combination of T1, T2, and T3 transistors that is associated with a first binning configuration may be asserted at step 306. Once the combination of T1, T2, and T3 transistors are asserted, a reset voltage of the floating diffusion regions may be sampled at step 308.

Because the voltage pixel binning is non-destructive, the pixels may be sampled in multiple binning modes in a single frame. This is optional, and a single binning mode may be sampled in each frame if desired. If multiple binning mode samples are desired in a single frame, steps 306 and 308 may optionally be repeated as indicated by arrow 307 (e.g., for a second binning mode). For each unique binning mode, a respective unique set of transistors T1, T2, and T3 may be asserted at step 306 and a respective reset voltage may be obtained at step 308.

After all desired reset voltage samples have been obtained, the method may proceed to step 310. At step 310, all T1 transistors may be asserted and all T2 and T3 transistors may be deasserted. In this state, transfer transistors may be asserted to transfer charge from each photodiode to a respective floating diffusion region. Next, at step 312, the combination of T1, T2, and T3 transistors associated with the first binning mode is asserted. The signal voltage may then be obtained from each pertinent floating diffusion region associated with that binning mode. For example, in a 2×2 binning mode, only one of every four floating diffusion regions has a signal voltage that needs to be sampled. The signal voltage may be used with the reset voltage for a correlated double sampling readout value.

If only one binning mode is being sampled per frame, the readout for the frame may be complete after step 314. If multiple binning modes are being sampled per frame, however, additional sampling may be performed. As shown in FIG. 9, in optional step 316, a combination of T1, T2, and T3 transistors associated with a second binning mode (e.g., a different combination than in step 312) may be asserted. The signal voltages of the floating diffusion regions pertinent in the second binning mode are then sampled at step 318. Similar to step 314, only the pertinent floating diffusion regions associated with the second binning mode may have their signal voltage sampled.

A reset voltage sample may be used to help correct the signal voltages obtained in step 318. There are a number of options for how to correct the signal voltages obtained in step 318. First, the reset voltages from step 308 when transistors T1, T2, and T3 were asserted in a combination associated the first binning mode may be used (even though the first and second binning modes have different combinations of T1, T2, and T3 asserted). In other words, the reset voltage sampled in connection with the first binning mode may still be used for correlated double sampling in the second binning mode. Another option is to use the reset voltages from step 308 when transistors T1, T2, and T3 were in a combination for the second binning mode. Yet another alternative is to obtain a reset voltage sample at step 320. At step 320, the floating diffusion regions may be reset (e.g., by asserting T1 transistors and the reset transistors), the combination of transistors T1, T2, and T3 associated with the second binning mode may be asserted, and the second reset voltages may be sampled. Obtaining a reset voltage for correcting a signal voltage after the signal voltage has been sampled may be referred to as uncorrelated double sampling.

Figure 10:
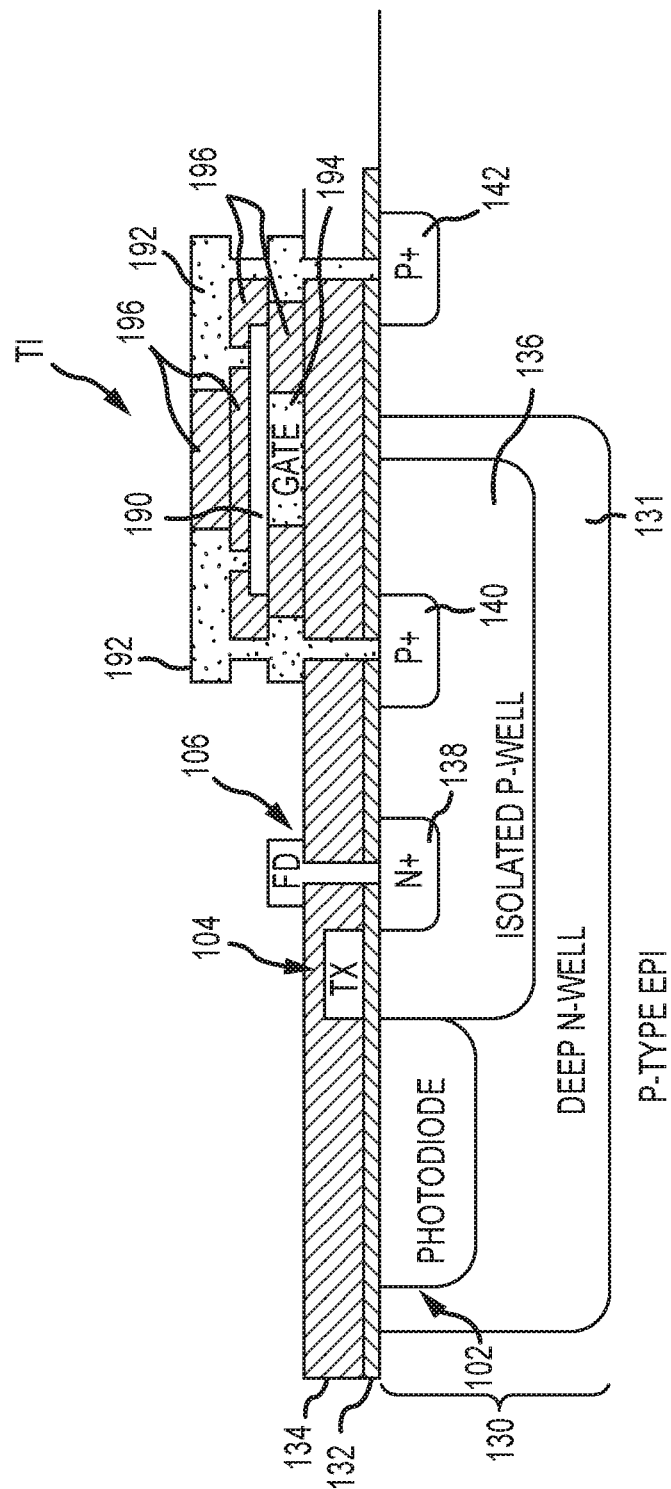
FIG. 10 is a cross-sectional side view of an illustrative image sensor showing how a floating diffusion region may be isolated using an isolated p-well region in accordance with an embodiment.
Figure 11:
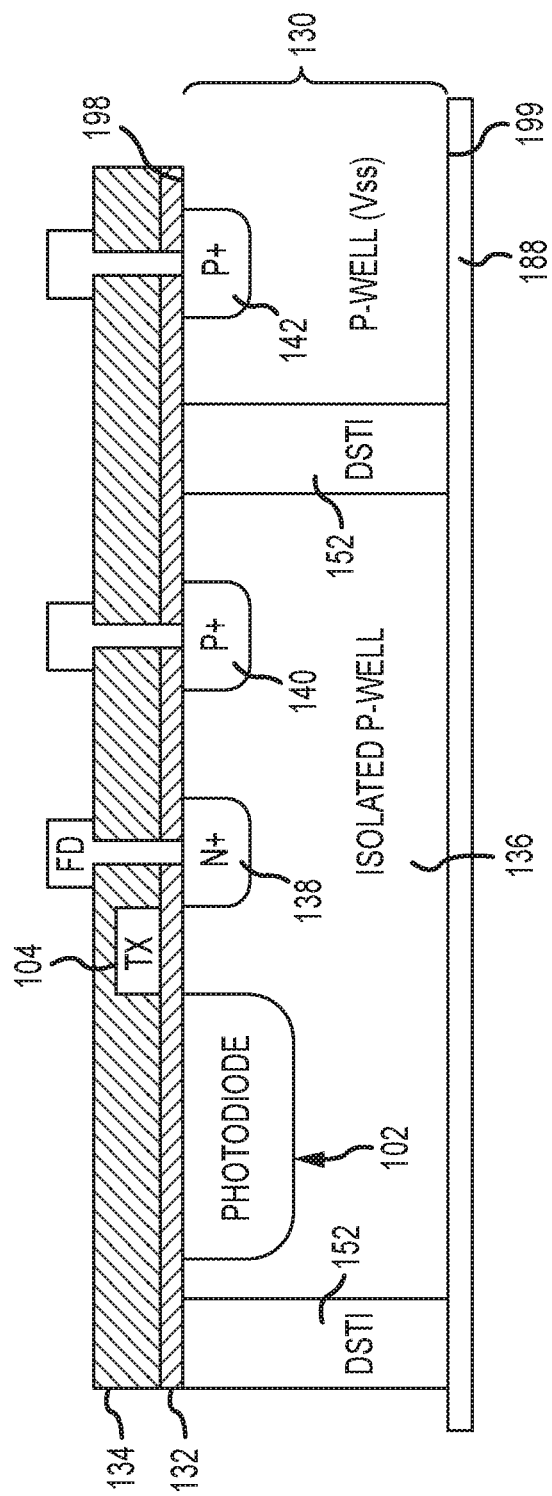
FIG. 11 is a cross-sectional side view of an illustrative image sensor showing how a floating diffusion region may be isolated using deep trench isolation in accordance with an embodiment.

If not isolated, the floating diffusion capacitor $C_{FD}$ may have an effective capacitance that is affected by neighboring circuit components. For the image sensor shown in FIGS. 5-8, the floating diffusion regions of each pixel may be isolated from the substrate so that the floating diffusion regions may be independently connected in series. FIG. 10 shows an image sensor with a floating diffusion region isolated using an isolated p-well region, whereas FIG. 11 shows an image sensor with a floating diffusion region isolated using deep trench isolation (DTI).

In FIG. 10, a substrate 130 may include photodiode 102. Substrate 130 may be a p-type epitaxial substrate with a deep n-well 131 and photodiode 102. An isolated p-well 136 may isolate n+ region 138 and p+ region 140. Floating diffusion 106 may be formed from n+ region 138. A transfer gate 104 is interposed between photodiode 102 and floating diffusion 106. Interlayer dielectric layers 132 and 134 (sometimes referred to as gate dielectrics) are formed below and over transfer gate 104. Isolated p-well 136 isolates p+ region 140 from p+ region 142. This allows photodiode 102 to remain grounded even as floating diffusion region 138 is independently coupled or uncoupled from ground (through transistor T1). The p+ region 142 may be a ground contact that is coupled to transistor T1. T1 is coupled between p+ regions 142 (on one side of the isolated p-well 136) and 140 (on the other side of the isolated p-well 136). Transistor T1 may be a semiconducting oxide transistor formed with an active channel of indium gallium zinc oxide (IGZO).

As shown in FIG. 10, transistor T1 includes active channel 190 (formed from IGZO), metal contacts 192, gate 194, and dielectric layers 196. All of transistors T1, T2, and T3 may optionally be semiconducting oxide transistors (e.g., having similar structure as shown in T1 in FIG. 10). Semiconducting oxide transistors have low leakage levels that may be useful in the image sensor discussed herein due to effective isolation of the floating diffusion regions. The semiconducting oxide transistors also may be formed within a metal stack without requiring additional silicon, resulting in efficient manufacturing.

In FIG. 10, the light collecting area for the pixel may include deep n-well 131 as well as photodiode 102. Isolated p-well 136 may be formed from p-type epitaxial silicon.

The example of using isolated p-well 136 with a surrounding deep n-well to isolate floating diffusion region 138 is merely illustrative. Alternatively, deep trench isolation such as deep trench isolation 152 may be used for isolation as shown in FIG. 11. The deep trench isolation may be formed from a material such as oxide or metal in a trench in substrate 130. The deep trench isolation may extend from a front surface 198 of substrate 130 to a back surface 199 of substrate 130. Buried oxide (BOX) 188 may be formed at the back surface of substrate 130. Isolated p-well 136 may still be formed around floating diffusion region 138. The light collecting area of the pixel in FIG. 11 includes photodiode 102 (and not an additional deep n-well as in FIG. 10). Although not explicitly shown in FIG. 11, a semiconducting oxide transistor may be coupled between p+ regions 140 and 142 in FIG. 11 similar to as depicted in FIG. 10.

Figure 12:
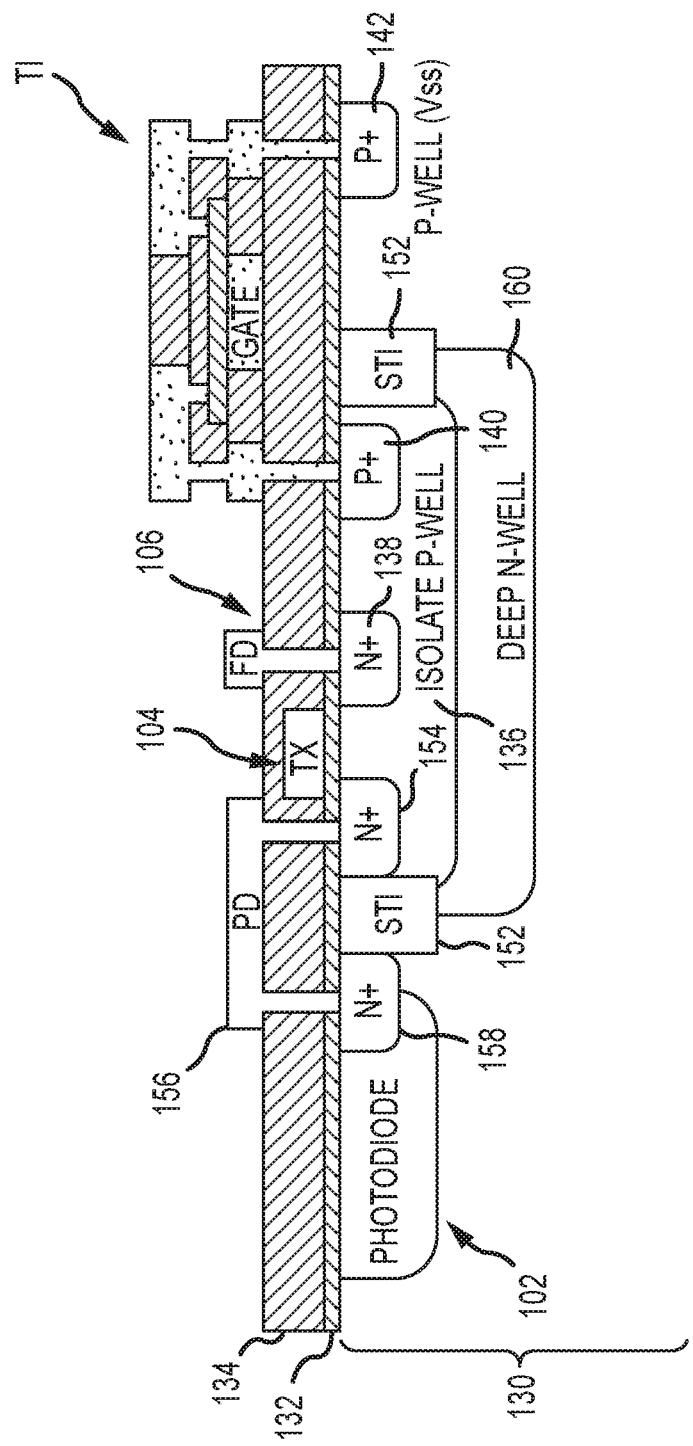
FIG. 12 is a cross-sectional side view of an illustrative image sensor showing how a floating diffusion region may be isolated by a p-well and selectively coupled to ground by an indium gallium zinc oxide (IGZO) transistor in accordance with an embodiment.

FIG. 12 is a cross-sectional side view of an image sensor showing another possible embodiment for isolating the floating diffusion region (FD) in a given imaging pixel. As shown in FIG. 12, a substrate 130 may include photodiode 102. Photodiode 102 may be electrically connected to n+ region 158 and n+ region 154. The n+ regions 154 and 158 may be separated by shallow trench isolation 152. A metal layer 156 may electrically connect n+ region 154 to n+ region 158 across STI 152. Substrate 130 may be a p-type epitaxial substrate with a deep n-well 160.

An isolated p-well 136 may isolate n+ regions 138 and 154 as well as p+ region 140. Floating diffusion 106 may be formed from n+ region 138. A transfer gate 104 is interposed between n+ region 154 (which is electrically connected to photodiode 102) and floating diffusion 106. Interlayer dielectric layers 132 and 134 (sometimes referred to as gate dielectrics) are formed below and over transfer gate 104. Isolated p-well 136 isolates p+ region 140 from p+ region 142. The p+ region 142 may be a ground contact that is coupled to transistor T1. T1 is coupled between p+ regions 142 (on one side of STI 152) and 140 (on the other side of STI 152). Transistor T1 may be a semiconducting oxide transistor formed with an active channel of a semiconducting oxide such as indium gallium zinc oxide (IGZO). T1 in FIG. 12 may be formed within a metal stack without requiring additional silicon. Although T1 is explicitly depicted in FIG. 12, all of transistors T1, T2, and T3 may optionally be semiconducting oxide transistors.

Figure 13:
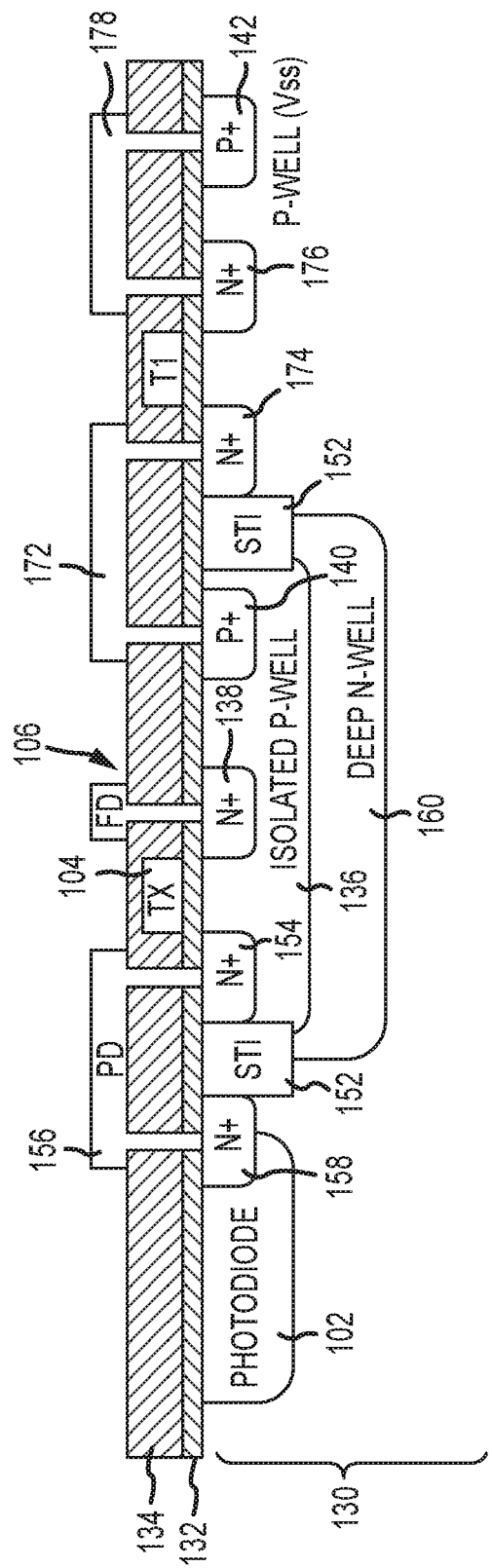
FIG. 13 is a cross-sectional side view of an illustrative image sensor showing how a floating diffusion region may be isolated by a p-well and selectively coupled to ground by a complementary metal oxide semiconductor (CMOS) transistor in accordance with an embodiment.

FIG. 13 is a cross-sectional side view of an image sensor showing yet another possible embodiment for isolating the floating diffusion region (FD) in a given imaging pixel. The image sensor depicted in FIG. 13 has a similar structure as in FIG. 12. However, instead of using IGZO transistor T1 as in FIG. 12, the transistor T1 in FIG. 13 is formed in the same manner as transfer transistor 104 (e.g., using complementary metal oxide semiconductor or CMOS techniques). P+ region 140 may be coupled to an n+ region 174 on the other side of shallow trench isolation 152 by metal interconnect layer 172. T1 may have a gate formed over substrate 130 between n+ region 174 and n+ region 176. N+ region 176 is then coupled to p+ region 142 by metal interconnect layer 178. T1 may be asserted to selectively ground floating diffusion region 138 (e.g., by selectively coupling p+ region 140 to p+ region 142).

Figure 14:
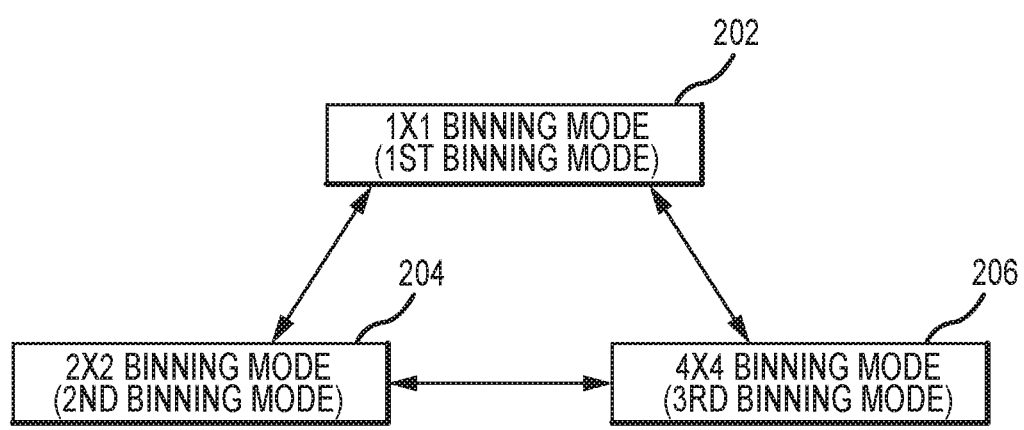
FIG. 14 is a state diagram showing illustrative binning modes for an image sensor with circuitry of the type shown in FIGS. 5-8 in accordance with an embodiment.

FIG. 14 is a state diagram showing illustrative binning modes for an image sensor with circuitry of the type shown in FIGS. 5-8 in accordance with an embodiment. Processing circuitry (also referred to as control circuitry) in an imaging system may place the image sensor in a desired binning mode (sometimes referred to as voltage binning mode). As shown, the image sensor may be operable in a first binning mode 202, a second binning mode 204, and a third binning mode 206. Each binning mode may have a different binning arrangement. For example, first binning mode 202 may be a 1×1 binning mode in which no binning occurs and each pixel is read out individually (as in FIG. 6). Optionally, in the 1×1 binning mode only a subset of the pixels may be read out to increase frame rate (this is known as using subwindows). Second binning mode 204 may be a 2×2 binning mode in which signals from each 2×2 group of pixels are binned and only one of every four pixels is read out (as in FIG. 7). Third binning mode 206 may be a 4×4 binning mode in which signals from each 4×4 group of pixels are binned and only one of every sixteen pixels is read out (as in FIG. 8).

The image sensor may switch between modes based on a user preference/selection, based on information from processing circuitry, (e.g., based on if a moving object is present in the scene or based on the magnitude of the velocity of a moving object in the scene), etc. The image sensor may be part of a system with different operating modes.

For example, in a first operating mode, the image sensor may run in first binning mode 202. If processing circuitry detects motion in the image data captured during the first binning mode, the image sensor may switch to second binning mode 204 for velocity determination. If the object is large enough, a centroiding algorithm may be used for more accurate velocity determination. If the object is moving fast enough (e.g., if the measured velocity exceeds a given velocity threshold), the image sensor may switch to third binning mode 206 for better velocity resolution.

In a second operating mode, the image sensor may run in third binning mode 206. When motion is detected, the image sensor may switch to the first binning mode 202 for one frame to obtain one frame at higher resolution for object identification.

Since the binning is non-destructive, a single frame of image data may be read in multiple ways if desired (e.g., in a first binning mode then again in a second binning mode).

The example in FIG. 14 of the image sensor having three binning modes is merely illustrative. In general, the image sensor may have any desired number of binning modes, each binning mode may have any desired binning arrangement, and the image sensor may switch between the binning modes in any desired manner.

The voltage binning described herein may be applicable to monolithic image sensors and stacked image sensors. In stacked image sensors, two or more substrates (e.g., wafers) are connected with a conductive interconnect layer. For example, at any location in the circuit diagrams of FIGS. 3 and 5, an interconnect layer may be included and the pixel circuit may be split between two substrates.

The techniques of non-destructive voltage binning described herein may also be used on read-out integrated circuits (ROICs). ROICs may be coupled to an array of photosensitive elements by conductive interconnect layers. For example, mercury cadmium telluride (HgCdTe) or another material (e.g., gallium arsenide) may be used to form photosensitive elements for infrared light detection. An ROIC with the selective binning capabilities described herein may be coupled to the photosensitive elements by conductive interconnect layers.

Figure 15:
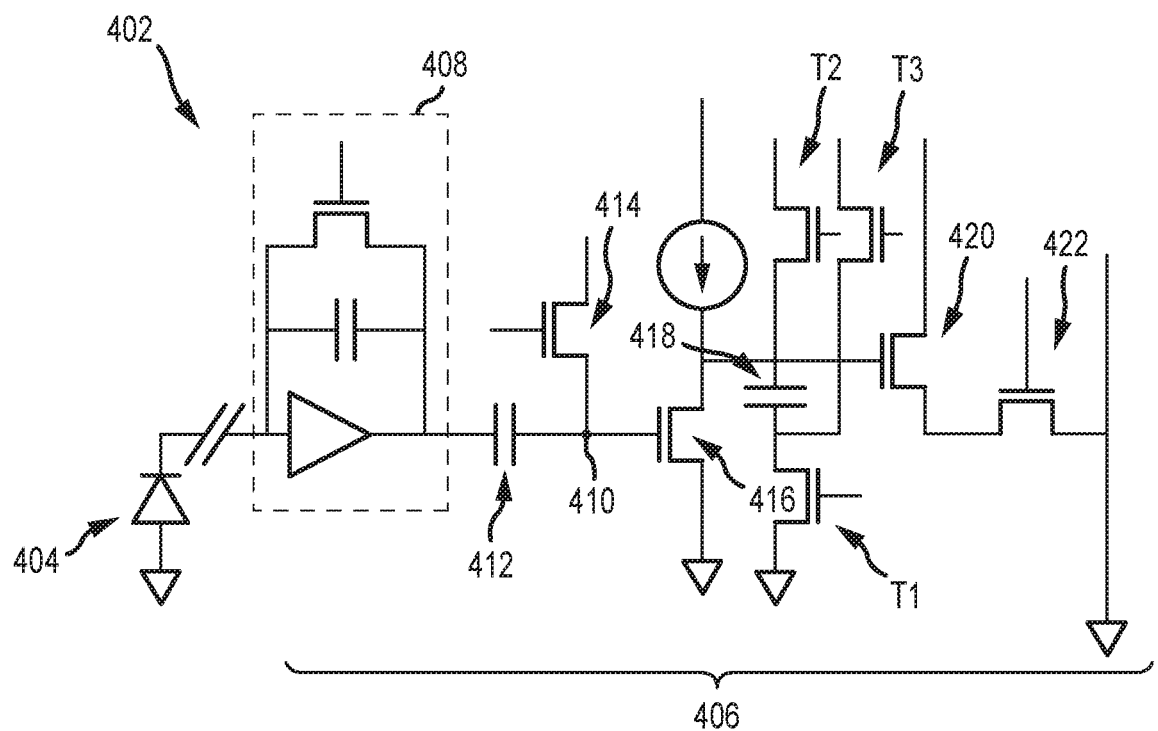
FIG. 15 is a circuit diagram showing how an illustrative readout integrated circuit may include transistors that enable pixel binning in the voltage domain in accordance with an embodiment.

FIG. 15 is a circuit diagram of an illustrative ROIC with selective binning capabilities. In image sensor 402 in FIG. 15, a photosensitive area 404 (e.g., that generates charge in response to infrared light) is coupled to a read-out integrated circuit (ROIC) 406. The photosensitive area 404 may be formed from mercury cadmium telluride (HgCdTe) or another material (e.g., gallium arsenide). The ROIC may include a transimpedance amplifier 408 (with an operational amplifier, capacitor, and transistor) that converts current to voltage. A capacitor 412 and floating diffusion region 410 are coupled to the output of the transimpedance amplifier. A reset transistor 414 is coupled to the floating diffusion region. The floating diffusion region is coupled to the gate of source follower transistor 416. A readout capacitor 418 is coupled one of the terminals of the source follower transistor. The readout capacitor may be coupled to transistors T1 (that selectively couple the readout capacitor to ground), T2 (that selectively couple the readout capacitor to a readout capacitor in an adjacent column), and T3 (that selectively couple the readout capacitor to a readout capacitor in an adjacent row) similar to as shown in connection with the floating diffusion capacitors of FIG. 5. FIG. 15 also shows an additional source follower transistor 420 and row select transistor 422.

Although readout capacitor 418 in FIG. 15 is in a different location and has a different application compared to the capacitors in FIG. 5, the selective binning techniques may be applied in a similar manner. This illustrates how the techniques of non-destructive voltage binning described herein may be used in numerous applications (such as in ROICs) and is not limited to the floating diffusion voltage binning shown in FIG. 5.

The foregoing is merely illustrative of the principles of this invention and various modifications can be made by those skilled in the art. The foregoing embodiments may be implemented individually or in any combination.

What is claimed is:

1. An image sensor comprising an array of imaging pixels, the image sensor comprising:
   a photodiode for a first imaging pixel of the array of imaging pixels, wherein the photodiode is configured to generate charge in response to incident light;
   a first floating diffusion capacitor for the first imaging pixel, wherein the first floating diffusion capacitor is formed from a first depletion region between a first n-type region and a first p-type region in a semiconductor substrate;
   a transfer transistor configured to transfer charge from the photodiode to the first floating diffusion capacitor;
   a first transistor configured to selectively couple the first p-type region to ground; and
   a second transistor configured to selectively couple the first floating diffusion capacitor to a second floating diffusion capacitor of a second imaging pixel in the array of imaging pixels.

2. The image sensor defined in claim 1, wherein the second imaging pixel is adjacent to the first imaging pixel.

3. The image sensor defined in claim 2, wherein the first imaging pixel is in a first row and a first column of the array of imaging pixels and wherein the second imaging pixel is in the first row and a second column of the array of imaging pixels.

4. The image sensor defined in claim 3, further comprising:
   a third transistor configured to selectively couple the first floating diffusion capacitor to a third floating diffusion capacitor of a third imaging pixel in the array of imaging pixels.

5. The image sensor defined in claim 4, wherein the third imaging pixel is in a second row and the first column of the array of imaging pixels.

6. The image sensor defined in claim 2, wherein the first imaging pixel is in a first row and a first column of the array of imaging pixels and wherein the second imaging pixel is in a second row and the first column of the array of imaging pixels.

7. The image sensor defined in claim 1, wherein the second floating diffusion capacitor is formed from a second depletion region between a second n-type region and second p-type region in a semiconductor substrate.

8. The image sensor defined in claim 7, wherein the second transistor selectively couples the first n-type region to the second p-type region.

9. The image sensor defined in claim 8, wherein the second imaging pixel is formed in an adjacent row and the same column as the first imaging pixel, the image sensor further comprising:
   a third imaging pixel in the array of imaging pixels, wherein the third imaging pixel is formed in an adjacent column and the same row as the first imaging pixel; and
   a third transistor configured to selectively couple the first n-type region to a third p-type region of a third floating diffusion capacitor of the third imaging pixel.

10. The image sensor defined in claim 1, wherein the first transistor is formed with an active channel of indium gallium zinc oxide.

11. The image sensor defined in claim 10, wherein the first p-type region is isolated from an additional p-type region that is coupled to ground.

12. An image sensor comprising:
   an array of imaging pixels, each imaging pixel of the array of imaging pixels comprising a photodiode configured to generate charge in response to incident light, a floating diffusion capacitor, and a transfer transistor configured to transfer charge from the photodiode to the floating diffusion capacitor;
   a plurality of transistors, wherein each transistor is at least coupled to the floating diffusion capacitor of a respective one of the imaging pixels; and
   control circuitry configured to operate in a first binning mode in which a first subset of the plurality of transistors are asserted during readout to non-destructively bin first groups of pixels in a voltage domain and a second binning mode in which a second subset of the plurality of transistors are asserted during readout to non-destructively bin second groups of pixels in the voltage domain, wherein the first and second groups are different, wherein the control circuitry is configured to non-destructively bin voltages from a first number of capacitors for a first readout in the first image frame, wherein the control circuitry is configured to non-destructively bin voltages from a second number of capacitors for a second readout in the first image frame, and wherein the second number is different than the first number.

13. The image sensor defined in claim 12, wherein the first binning mode is a 2×2 voltage binning mode.

14. The image sensor defined in claim 13, wherein, in the 2×2 voltage binning mode, voltages from the floating diffusion capacitors of four imaging pixels in a 2×2 arrangement are binned on the floating diffusion capacitor of a single one of the four imaging pixels.

15. The image sensor defined in claim 14, wherein the second binning mode is a 4×4 voltage binning mode in which voltages from the floating diffusion capacitors of sixteen imaging pixels in a 4×4 arrangement are binned on the floating diffusion capacitor of a single one of the sixteen imaging pixels.

16. The image sensor defined in claim 12, wherein the photodiodes of the imaging pixels are formed in a semiconductor substrate and wherein the floating diffusion capacitors of the imaging pixels are formed by a depletion region between an n-type region and an isolated p-type region in the semiconductor substrate.

17. An image sensor comprising:

an array of imaging pixels, each imaging pixel of the array of imaging pixels comprising a capacitor;

a plurality of transistors, wherein each transistor of the plurality of transistors is coupled to the capacitor of at least one of the imaging pixels; and control circuitry configured to use the plurality of transistors to non-destructively bin voltages from two or more capacitors on a single capacitor during readout, wherein the control circuitry is configured to non-destructively bin voltages from a first number of capacitors for a first readout in a first image frame, wherein the control circuitry is configured to non-destructively bin voltages from a second number of capacitors for a second readout in the first image frame, and wherein the second number is different than the first number.

18. The image sensor defined in claim 17, wherein each capacitor is a floating diffusion capacitor formed by a respective depletion region between an n-type region and an isolated p-type region in the semiconductor substrate.

* * * * *